United States Patent
Myhre

(10) Patent No.: US 7,041,324 B2
(45) Date of Patent: May 9, 2006

(54) DRINKABLE OMEGA-3 PREPARATION AND STORAGE STABILIZATION

(75) Inventor: Johan Myhre, Oslo (NO)

(73) Assignee: Pronova Biocare AS, Lysaker (NO)

( * ) Notice: Subject to any disclaimer, the term of this patent is extended or adjusted under 35 U.S.C. 154(b) by 79 days.

(21) Appl. No.: 10/149,614

(22) PCT Filed: Dec. 22, 2000

(86) PCT No.: PCT/NO00/00448

§ 371 (c)(1),
(2), (4) Date: Jun. 11, 2002

(87) PCT Pub. No.: WO01/47377

PCT Pub. Date: Jul. 5, 2001

(65) Prior Publication Data

US 2003/0082275 A1    May 1, 2003

(30) Foreign Application Priority Data

Dec. 28, 1999 (NO) ................................. 19996525

(51) Int. Cl.
*A23L 1/302* (2006.01)

(52) U.S. Cl. .................... 426/72; 426/74; 426/590; 426/599; 426/602

(58) Field of Classification Search ................ 426/72, 426/74, 590, 599, 602
See application file for complete search history.

(56) References Cited

U.S. PATENT DOCUMENTS

| | | |
|---|---|---|
| 4,670,285 A | 6/1987 | Clandinin et al. |
| 4,826,702 A | 5/1989 | Hayashi et al. |
| 5,223,285 A | 6/1993 | DeMichele et al. |
| 5,567,730 A | 10/1996 | Miyashita et al. |

FOREIGN PATENT DOCUMENTS

| | | |
|---|---|---|
| BE | 668727 | 2/1966 |
| CN | 1108891 | 9/1995 |
| EP | 0 304 115 | 2/1989 |
| EP | 0 493 439 B1 | 11/1994 |
| EP | 0 713 653 A1 | 5/1996 |
| EP | 0711 503 A2 | 5/1996 |
| JP | 07-107938 | 4/1995 |
| JP | 08089167 | 4/1996 |
| JP | 08-239685 | 9/1996 |
| JP | 10-330781 | 12/1998 |
| NO | 41943 | 9/1925 |
| NO | 954573 | 3/1996 |
| NO | 180148 | 2/1997 |
| WO | WOI 89/05101 | 6/1989 |
| WO | WO 91/17670 | 11/1991 |
| WO | WO 00/04887 | 2/2000 |
| WO | 01/47377 A3 * | 7/2001 |

OTHER PUBLICATIONS

"Eicosapentaenoic acid and prevention of thrombosis and atherosclerosis", Dyrberg et al, Lancet ii, 117-119, Jul. 15, 1978.
"Toxicity of dietary lipid peroxidation products", S. Kubow, Trends in Food Sciences & Technology, Sep., 67-71 (1990).
"Mat og medisin", Bjomeboc et al, Universitetsforlaget, Oslo, pp. 207-216, 1994.

* cited by examiner

*Primary Examiner*—Helen Pratt
(74) *Attorney, Agent, or Firm*—Merchant & Gould P.C.

(57) ABSTRACT

A liquid nutritional and/or refreshing preparation is described to which an emulsion is added containing oils with polyunsaturated fatty acids and remedial substances in a water-based drink, in such a manner that the drink does not turn rancid within the storage time of the water-based phase, a method for its production and its application.

11 Claims, No Drawings

DRINKABLE OMEGA-3 PREPARATION AND STORAGE STABILIZATION

The present invention relates to a liquid nutritional and refreshing preparation to which oils are added containing omega-3 fatty acids and remedial substances wherein the preparation does not turn rancid with the storage time indicated for the liquid phase, a method for its production and its application.

The human body is capable of producing most of the saturated fatty acids which it requires. Two polyunsaturated fatty acids, eicosapentaenoic acid (EPA) and docosahexaenoic acid (DHA), however, cannot be synthesised and have to be supplied through the diet. They are therefore called essential fatty acids (EF). EPA and DHA constitute the most important so-called omega-3 fatty acids. Fish oil is known to be the best source of these omega-3 fatty acids.

In Norway there is a long tradition of using cod liver oil as a dietary supplement, due mainly to the fact that it was regarded as a valuable vitamin supplement. Only recently has the important role of fish oil been reported as a source of polyunsaturated fatty acids with the last double bond placed at the third last carbon atom in the carbon chain (omega-3 fatty acid) (Dyrberg J., Bang H. O., Stoffersen E., Moncada S. and Vane J. "Eicosapentaenoic acid and prevention of thrombosis and atherosclerosis", Lancet ii, 117–119, 1978). Subsequent research has shown that these fatty acids reduce the risk of heart disease as well as having a positive effect on children's development, as well as on the skin. Results have also been disclosed indicating the positive effect of these fatty acids on certain mental illnesses, autoimmune diseases and joint complaints. There are therefore many reasons for considering taking fish oil as a valuable dietary supplement, including the long-term effect which this dietary supplement is now thought to have. The problem, however, has been and still is the taste which many people consider to be unpleasant, both during ingestion and in subsequent regurgitation. Modern production methods to-day manufacture cod liver oil and fish oil with a taste which is not unpleasant, but polyunsaturated fatty acids are highly unstable and are subject to oxidation when exposed to air, as well as auto-oxidation in concentrates of fish oil. These processes cause them to turn rancid, giving the product an unpleasant smell and taste.

In addition to the unpleasant taste of rancid fish oil, results have also been disclosed which may indicate that oxidation products from fish oil are damaging to health (Kubow S., "Toxicity of dietary lipid peroxidation products", Trends in Food Sciences & Technology, September, 67–71 (1990)). Thus it is extremely important to provide fish oil products which are not oxidised before ingestion.

The production of cod liver oil is known in the form of emulsions in order to improve the taste but these are highly subject to oxidation during storage as they are exposed to air. Methods are also known for producing mixtures of marine and vegetable oils in a ratio of less than one part marine oil to three parts vegetable oil (EP-A-0304 115), and for improving the storage of edible oils and fat and their emulsions (BE-A-0668 727), but in this case marine oils are not mentioned. U.S. Pat. No. 4,826,702 describes a dressing consisting of a fish oil phase and an aqueous phase which are stored separately and mixed immediately before use in order to minimise oxidation of fish oils.

In CN 1108891 are ω-3 fatty acids added to milk by emulgating the fatty acids. The concentration of the ω-fatty acids is 0.01–0.1%, thus lower than is the present invention.

JP 08089167 relates to fermented milk whereto ω-3 fatty acids are added in concentrations from 0.001–1 weight % and an antioxidant in an oil-in-water emulsion, with long storage time. This mixture does not contain fish oil, preserving agent, nor vitamins, and the concentrations of the ω-3 fatty acids are lower than in the present invention.

NO B 180148 relates to the production of an article of food containing ω-3 fatty acids from fish oil in powder form in addition to vitamins, sweeteners and aroma. The concentration of fish oil is 0.22% and 0.25% (weight/volume). The method comprises production of a dry powder mixture of fish oil and vitamins which thereafter is stirred into heated fruit or vegetable juice, and is differing essentially from the method according to the present invention.

NO B 41943 relates to method wherein cod liver oil and another oil are mixed and thereafter added to nutritional or refreshing preparation, without adding vitamins, emulgators, sweeteners and preserving agents. The content of fish oil is lower than in the present invention.

NO A 954726 relates to fruit juices enriched with gamma linolenic acid (GLA) and dihomogammalinolenic acid (DGLA) and optionally EPA and DHA. This drink does not comprise fish oil, the fatty acids are derived from plant oils.

NO A 954573 relates to milk products enriched with GLA and/or DGLA and optionally EPA and DHA. This product does not comprise the same components as in the present invention.

WO 00/04887 relates to a medicament to prevent or treat cardiovascular diseases and comprises phytosterols and phytostannols from plants and ω-3 fatty acids from plants or marine oils, and synergism between the phytosterols, phytostannols and the ω-3 fatty acids is maintained. The preparation is thus different from the present invention.

U.S. Pat. No. 5,567,730 relates to a method for stabilizing ω-3 fatty acids by dispersing ω-3 fatty acids, an acid derivative thereof and an oil or fat containing an ω-3 unsaturated fatty acid or an acid derivative thereof in an aquos solution without using emulgating agents. This invention differs thus essentially from the present invention.

U.S. Pat. No. 4,670,285 relates to a breast milk substitute wherein vegetable oil is mixed with at least one of an ω-6 fatty acid or ω-3 fatty acid, wherein the latter may be contained in lipids from egg yolk or fish oil. The content of ω-3 fatty acids is less than 0.06% and the mixture does not comprise the other compounds of the present invention.

In EP 0493439-B1 a product is described comprising a tube or a soft plastic container made of an airtight material and containing an unhydrogenated marine oil preparation in the form of an oil-in-water emulsion. The oil is composed of a cod liver oil or other marine oil or concentrates or mixtures thereof, hereinafter designated as cod liver oil, and the amount of oil added to the emulsion is such that the emulsion obtains a mayonnaise or paste-like consistency, i.e. it contains at least 65 weight % oil. The oil is mainly polyunsaturated and constitutes between 66 and 88 weight % of the emulsion. The actual tube or container is designed in such a manner that when it is used it is compressed proportionally with the amount of emulsion remaining after one dosage, with the result that no air space is formed in the container and therefore no appreciable oxidation will occur in the cod liver oil product. During the manufacturing process this product is not in contact with air and this absence of air prevents oxidation of the fish oil in the product. Moreover, the content of vitamin E will act as an antioxidant and play an important role in the defence against free radicals. The product consists of an oil-in-water emulsion (80:20; oil:water) with the viscosity of mayonnaise. The marine oils exist as a dispersed phase with a diameter down to 1 μm in a continuous hydrophase. The packing factor for spherical particles of an equal size is known to be a maximum of 74% and with an oil content above this, the lipid micelles are in a disturbed geometrical structure. Despite this the emulsion retains its physical stability. The high oil content gives the emulsion a high degree of viscosity, which appears to help to prevent the polyunsaturates from being auto-oxidised. The emulsion is kept in airtight tubes, thus preventing oxidation during storage and dosing.

The above-mentioned products are composed of viscous emulsions and mayonnaise-like mixtures which it is not natural to ingest in order to cover the body's liquid requirements. So far the present inventors have no knowledge ω-3 preparations in form of refreshing drinks and fruit drinks to which fish oil is added in such a manner that it does not turn rancid over time under normal storage temperature in a refrigerator.

Furthermore the above-mentioned products produce the disadvantageous effect that youngsters and children are not motivated to use and consume the product, and if they are forced by their parents they may produce a serious dislike.

It is therefore an object of the present invention to produce ω-3 preparations in form of refreshing drinks without the above-mentioned disadvantages and a method for manufacturing such drinks. This object is achieved with the present invention, characterized by that which is presented in the attached claims.

The daily dose of omega-3 fatty acids which is recommended to-day is 1000 mg–2000 mg, which comprises 540 mg–1080 mg docosahexaenoic acid (DHA) and 385 mg–770 mg eicosapentaenoic acid (EPA). Known preparations which contain this are 4–6 gelatine capsules or 5 grams of fish oil/cod liver oil containing approximately 20% omega-3 fatty acids. At the present time there are no other known ways of ingesting this daily dose without eating oily fish. The reason appears to be that no other products exist which are palatable, practical to use and where the unsaturated fatty acids are not oxidised or auto-oxidised, and which youngsters and children accept The object of the present invention, therefore, is to produce:

1. Ordinary consumer goods which tastes and looks like orange juice, skimmed milk or breast milk substitute which, despite the addition of fish oil with polyunsaturates, still tastes and is perceived like the pure juice or milk product, with no trace of a fish oil taste, where vitamins E and C are either present in the ingredients or are added.

2. A method for manufacturing the product which is of such a nature that, during production and subsequently during distribution, storage and daily use (with shaking before use and daily reduction of the contents of the package), the unsaturated fatty acids are still unaltered in taste and no oxidation has taken place over a period representing the storage time of the water-based phase.

The present invention relates to a liquid nutritional and/or refreshing preparation to which oil with polyunsaturated of fatty acids is added in such an amount that when ingesting the preparation in a volume less than the body's daily liquid requirement, the supply of a recommended daily dose of omega-3 fatty acids is obtained. The fatty acids are added in such a manner that neither oxidation nor auto-oxidation occurs during the preparation's storage time despite the fact that the drink's surface is in contact with air.

The manufacture of the preparation according to the invention is implemented as follows: an emulsion containing 65–90 weight % oil, which may be vegetable or fish oil, alone or in combination, containing at least 15 weight % omega-3 fatty acids, for example 66–88 weight % cod liver oil or other marine oil, for example as described in EP-B-0493439, is stirred vigorously together with the water-based liquid phase so that the emulsion is comminuted in the liquid phase. Surprisingly, it was shown that the oil product, like the basic emulsion, remained dispersed in the liquid phase during daily shaking in addition to the movements to which a carton is naturally exposed during pouring into a glass and storage in the refrigerator. The mixture ratio between emulsion and drink may vary from 1:10 to 1:100, preferably from 1:20 to 1:40.

During manufacture a special emulsification method is employed for the oil with added omega-3 fatty acids, or the fish oil, which results in the lipid omega-3 phase of an oil-in-water emulsion being made in such a way that an emulsion is produced step by step, where in the first step all the omega-3 oil is in the form of an 80% lipid phase where the hydrophase is an emulsifying agent for example egg yolk, to which in turn is added an aqueous solution of vitamin C. Also added in this step are aromatic oils, sweetening agents, pH-regulating agents, water, conservation agents and vitamins. In other steps the liquid refreshing and/or nutritional phase (FNF) is added in such a manner that with regard to the aforementioned first step it is distributed in FNF and the ratio between the lipid phase and the hydrophase remains unaltered from the first step. This mixing into FNF may be implemented by vigorous stirring in a commercially available food mixer or other suitable mixing devices. The finished product will now comprise a system where the first step's 2 phases are distributed in a relatively large amount of solution with a high content of vitamin C/ascorbic acid whose FNF is composed of, e.g., fruit juice, as a third phase.

Surprisingly, it was also shown that the polyunsaturated fatty acid in the drink according to the invention were not oxidised in the course of the storage time of the water-based liquid phase (FNF). Without having to commit ourselves to a specific theory, however, it appears probable that auto-oxidation is not likely in a system where the distance is so great between the emulsion drops, where the oil in the emulsion has a diameter of approximately 1 μm. Oxidation due to the air stratum in balance with the liquid surface can be reduced by a combination of emulsifying agent, such as egg yolk to which vitamin C is added in aqueous solution, and the antioxidant, vitamin E which is either present in the marine oil or is added to the basic material. The addition of vitamin C in the form of, for example, fruit juice, or as such will provide a synergistic effect by causing vitamin E to be regenerated. Even though it is known that vitamin C can regenerate vitamin E (Bjørnebo, G., E. Antioksidanter, in "Mat og medisin" Ed. Gunn-Elin Aa. Bjørneboe, Christian A. Drevon, Kaare R. Norum. Universitetsforlaget, Oslo, pages 207–216, 1994), the combination of egg yolk with vitamin C is new and it is very surprising that the unstable polyunsaturated fatty acids were not oxidised by the air supply which is present over the surface of the liquid in, for example, a cardboard carton which is lifted and shaken daily. The combination of egg yolk, vitamin E in the lipid phase and vitamin C in the hydrophase forms a barrier against free radicals, where vitamin C regenerates vitamin E which quantitatively is the most important fat-soluble antioxidant. There is no evidence that this system is known to completely prevent discernible oxidation of the polyunsaturated fatty acids within the given period.

The invention will now be further illustrated by examples which should in no way be considered limiting.

EXAMPLE 1

The example illustrates a drink according to the invention, based on orange juice.

The manufacture takes place in two stages, where in stage 1 an emulsion is produced containing omega-3 fatty acids, which in stage 2 are mixed with orange juice in a ratio of 1:20 while being vigorously stirred in an emulsifier (Koruma disho s 160/400 5745, Germany). During storage, without movement, stage 1 will be separated from stage 2 and lie on the top.

The content of ingredients is illustrated in Table 1.

TABLE 1

| Stage | Ingredients | Amount (g) |
|---|---|---|
| 1 | Fish oil with 40% omega-3 | 8000 g |
|   | Egg yolk | 50 g |
|   | Lemon oil or orange oil | 100 g |
|   | Sugar | 477 g |
|   | Salt | 100 g |
|   | Citric acid | 200 g |
|   | Water | 500 g |
|   | Preserving agents E211, E202, E218 | 50 g |
|   | Vitamin C (Ascorbic acid) | 63 g |
|   | Vitamin E | 10 g |
|   | Total | 10000 g |
| 2 | Orange juice with 30 mg ascorbic acid/100 g - total 57 g | 190000 g |
|   |   | 200000 g |

EXAMPLE 2

The example illustrates a drink according to the invention, based on orange juice.

The manufacture takes place as in Example 1, in two steps. If, instead of orange juice, a concentrate of orange juice is used, water is supplied in an additional step 3, in amounts corresponding to the amount of water removed from the concentrate used in step 2.

EXAMPLE 3

The basic material consisting of 50 grams of Coromar® which contains fish oil, water, egg, vitamins (ascorbic acid, sodium ascorbate, alpha-tocopherol, folic acid), aroma (orange oil), preserving agent (potassium sorbate, sodium benzoate), sweetening agent (asulpham K, sodium cyclamate, sodium saccharinate), acidity regulating agent (citric acid), stabiliser (guarana kernel flour, xanthane rubber), was stirred into 1 liter of orange juice by a domestic food mixer. This mixture will contain a total of 13 grams of omega-3 fatty acids in the form of triglycerides. 100 ml of this drink will give the recommended daily dose of 1.3 grams of omega-3 fatty acids.

EXAMPLE 4

The basic material consisting of 50 grams of Coromar® which contains fish oil, water, egg, cocoa, vitamins (ascorbic acid, sodium ascorbate, alpha-tocopherol, folic acid), aroma (peppermint oil), preserving agent (potassium sorbate, sodium benzoate), sweetening agent (asulpham K, sodium cyclamate, sodium saccharinate), stabiliser (guarana kernel flour, zanthane rubber), was stirred into 1 liter of chocolate milk by a domestic food mixer. This mixture will contain a total of 13 grams of omega-3 fatty acids in the form of triglycerides. 100 ml of this drink will give the recommended daily dose of 1.3 grams of omega-3 fatty acids.

EXAMPLE 5

The Example illustrates breast milk substitute with full dose ω-3 fatty acids.

It is in Norway recommended that the amount of essential fatty acids in breast milk substitute is equivalent to the amount of linolenic acid in the mixture, i.e. 0.60 g/100 g breast milk substitute.

The preparation of 800 ml breast milk substitute according to the invention is prepared as in Example 1, by mixing 100 g mixed breast milk substitute with 2 g Coromar, prepared as in Step 1, Example 1, whereupon 200 ml water is added in step 2 and vigorously stirred This content of ω-3 DHA and EPA is 0.60 g.

For all the preceding examples applies that if Step 2 of the preparation does not immediately follow Step 1, the product from Step 1 can be stored in an airtight container without being oxidised.

EXAMPLE 6

This example illustrates the lasting quality of the mixture in example 2.

Orange juice with added Coromar® was made as described in example 1 and filled in a 1-liter cardboard carton which was stored at approximately +4° C. in an ordinary refrigerator. Once a day the carton was removed, shaken and approximately 30 ml was poured out and sampled by a test panel. This panel was composed of 20 randomly selected persons of both sexes. The drink was assessed according to the following criteria: rancid smell and taste, taste of fish oil, oily feeling in the mouth and juice taste. After 30 days, where the content had been reduced by 30 ml every day, no rancidity of the fish oil was registered on the basis of taste. This experiment was intended to correspond to normal storage in a refrigerator in a kitchen and shows that the lasting quality is within the lasting quality indicated for the orange juice and was thus satisfactory as such.

EXAMPLE 7

This example demonstrates a comparison between orange juice with added Coromar® as in Example 2 and orange juice without Coromar®.

The test panel was composed as described in Example 4. They were presented with sample A and sample B in unmarked, clear glasses. Sample A consisted of a drink as described in Example 2, stored in a refrigerator at 4° C. for 60 days. Sample B consisted of pure orange juice, stored under the same conditions as sample A.

The result was as follows: visually, no one could see any difference between the two samples. To most people in the panel the samples tasted different but no one reported an unpleasant taste. This shows that the polyunsaturated fatty acids in the drink according to the invention did not turn perceptibly rancid over a period which was considerably longer than the normal storage time for the water-based phase.

The invention claimed is:

1. A method for manufacturing a liquid nutritional and refreshing preparation comprising a water-based liquid phase and an emulsion which has a storage time being at least that of the liquid phase alone without becoming rancid, the method comprising first, producing an emulsion containing 65–90 weight % liquid oil containing at least 15 weight percent omega-3 fatty acids in a lipid phase and an emulsifying agent in a hydrophase, wherein aromatic oil, sweetening agent, pH-regulating agent, water, preserving agents, vitamins, and antioxidants are combined with the emulsion;

second vigorously stirring the emulsion into an added water-based liquid phase in such a manner that the emulsion is distributed homogeneously in the water-based liquid phase and the ratio between the lipid phase and the hydrophase in the emulsion is unaltered.

2. A method as specified in claim 1, wherein the emulsion is composed of 80% of fish oil with 40% omega-3, fatty acids 0.5% egg yolk, 1% lemon oil, 4.8% sugar, 1% salt, 2% citric acid, 5% $H_2O$, 0.5% preserving agents from the group consisting of sodium benzoate, potassium sorbate and methyl parahydroxy benzoate, 0,6% ascorbic acid, 0.1% vitamin E, all based on weight.

3. A method as specified in claim 1, wherein the oil comprises vegetable oil or marine oil, alone or in combination.

4. A method as specified in claim 1, wherein the emulsion contains 66–88% weight % fish oil, and the emulsifying agent is egg yolk.

5. A method as specified in claim 1, wherein the ratio between emulsion and water phase is from 1:10 to 1:100.

6. The method as specified in claim 5, wherein the ratio between emulsion and water phase is from 1:20 to 1:40.

7. A method as specified in claim 1, wherein the water-based liquid phase is selected from the group consisting of sugary drinks, mineral water, fruit cider, fruit juice, milk, breast milk substitute, coffee or tea.

8. A method as specified in claim 7, wherein the water-based liquid phase is breast milk substitute.

9. A method as specified in claim 1, wherein the water-based liquid phase is orange juice.

10. A method as specified in claim 1, wherein the liquid nutritional and/or refreshing preparation contains 4 weight % fish oil with 40% omega-3 fatty acids, 0.25 weight % egg yolk, 0.05 weight % lemon oil or orange oil, 0.239 weight % sugar, 0.05 weight % salt, 0.1 weight % citric acid, 0.25 weight % water, 0.025 weight % preserving agents from the group consisting of sodium benzoate, potassium sorbate and methyl parahydroxy benzoate, 0.03 weight % vitamin C (ascorbic acid), 0.005 weight % vitamin E and 95 weight % orange juice containing 57 g ascorbic acid.

11. A method as specified in claim 1, wherein the resulting liquid nutritional and/or refreshing preparation contains 13 grams of omega-3 fatty acids per 1000 ml of drink.

* * * * *